United States Patent

Koyanagi et al.

[11] Patent Number: 5,402,308
[45] Date of Patent: Mar. 28, 1995

[54] PORTABLE DISK STORAGE APPARATUS USING FLEXIBLE CABLE FOR SHOCK ABSORPTION

[75] Inventors: Ichiroh Koyanagi; Makoto Ohtuki, both of Yokohama; Fumitomo Ohsawa; Takayuki Satoh, both of Fujisawa, all of Japan

[73] Assignee: International Business Machines Corporation, Armonk, N.Y.

[21] Appl. No.: 58,597

[22] Filed: May 7, 1993

[30] Foreign Application Priority Data

May 12, 1992 [JP] Japan .................................. 4-119087

[51] Int. Cl.6 .......................... H05K 7/14; G06F 1/16
[52] U.S. Cl. ................................................. 361/685
[58] Field of Search ...................... 364/708.1; 360/137; 248/634, 636, 638; 361/683–686; 174/254

[56] References Cited

U.S. PATENT DOCUMENTS 4,979,062 12/1990 Stefansky et al. ............. 360/137 X
5,195,022 3/1993 Hoppal et al. ...................... 361/685
5,243,495 9/1993 Read et al. .......................... 361/685

FOREIGN PATENT DOCUMENTS 62-137761 6/1987 Japan ........................... G11B 17/04
1-319194 12/1989 Japan ........................... G11B 25/04
3-137882 6/1991 Japan ........................... G11B 25/04

Primary Examiner—Michael W. Phillips
Attorney, Agent, or Firm—Roy W. Truelson; Matthew J. Bussan

[57] ABSTRACT

A fixed disk storage unit is mounted in a protective outer case, and is supported at one end by a flexible cable which connects a connector of the protective outer case with the fixed disk storage unit in the protective outer case, and supported at the other end by using elastic shock absorbers against the elasticity of the flexible cable. A head/disk enclosure including a rotatable disk and a head actuator of the fixed disk storage unit therein, and an electronic card on which electronic circuits are mounted, are placed abreast on substantially the same plane in the protective outer case, and the head/disk enclosure is supported by the shock absorbers. This construction provides a shockproof and portable disk storage apparatus which is small-sized and whose manufacturing process is simple.

8 Claims, 6 Drawing Sheets

PORTABLE DISK STORAGE APPARATUS USING FLEXIBLE CABLE FOR SHOCK ABSORPTION

FIELD OF THE INVENTION

The present invention relates to a small disk storage apparatus, and more particularly, to a shockproof and portable disk storage apparatus which can be removed from a data processing system and carried around.

BACKGROUND OF THE INVENTION

The disk storage apparatus plays an important role as external storage apparatus for storing data and programs in a data processing system such as a personal computer. Disk storage apparatus are divided into two types: One type is a floppy disk storage apparatus or an optical or magneto-optical storage apparatus in which the mediums are exchangeable. The other type is a fixed magnetic hard disk storage apparatus in which the medium is unexchangeable. The fixed magnetic hard disk storage apparatus has a fast rotatable disk medium and a fast movable head actuator in an enclosure of which environment is controlled. Therefore, it has a large amount of storage and is provided with fast access and the high performance of reading and writing operations by using an electromechanical servomechanism of high precision. Therefore, in this respect, it is superior to a disk storage apparatus in which the medium is exchangeable. However, such a fixed magnetic hard disk storage apparatus could not be freely exchanged and carried around until recently, because it is relatively large-sized and has a mechanical structure of high precision which is very vulnerable to shock.

Currently, however, the so-called 2.5-inch type of fixed magnetic hard disk storage, which is about 10 cm×7 cm×1.3 cm in size, about a hundred and several tens grams in weight, and has a storage capacity of more than 40M bytes, is on the market, A 1.8-inch type of fixed magnetic hard disk storage unit has also appeared which is smaller and lighter than the 2.5-inch type and the storage capacity and access time of which are much the same as the 2.5-inch type. Under such circumstances, the fixed magnetic disk storage apparatus has now become exchangeable and portable.

On the other hand, as the performance and functions of hardware and software of a personal computer, which is a body of a data processing system, improve, for example, the appearance of a portable notebook-type personal computer, the necessity of storing a large amount of data and programs at high speed and the demand for a fixed magnetic disk storage apparatus which is small-sized, light, exchangeable, and portable increase by degrees.

Prior art references, Japanese Published Unexamined Patent Applications (PUPAs) No. 3-137882, No. 1-319194, and No. 62-137761 disclose conventional types of exchangeable and portable fixed magnetic hard disk storage apparatus. Japanese PUPA No. 3-137882 discloses an exchangeable and portable fixed magnetic hard disk storage apparatus, in which a head/disk enclosure is elastically supported on a frame body by using a vibration-proof rubber damper and an electronic card attached to the head/disk enclosure is connected, through a flexible cable, to a connector. It also discloses a construction in which the head/disk enclosure and the electronic card are detached and arranged so as to be overlaid with each other in the frame body and only the head/disk enclosure is elastically supported on the frame body by using the vibration-proof rubber damper. Japanese PUPAs No. 1-319194 and No. 62-137761 disclose a construction in which a disk drive body is elastically attached to a case and electrically connected to the outside through a flexible cable.

Since a disk storage apparatus includes a mechanical construction of a rotatable disk and a head actuator moving on the disk, such a mechanical construction may be damaged by shock. Therefore, for a portable disk storage apparatus, measures must be taken to absorb shock. Though measures to absorb shock are taken in the portable disk storage apparatus disclosed in the above Japanese PUPAs of prior art, there are still some problems to be solved in respect to absorbing shock as well as to making the portable disk storage apparatus small and thin and making its manufacturing and assembling process simple, which are other important factors for the portable disk storage apparatus.

SUMMARY OF THE INVENTION

Therefore, an object of the present invention is to provide a construction of a shockproof and portable disk storage apparatus which not only has measures to absorb shock, but also has the advantages of smallness and thinness in size and simplicity in its manufacturing and assembling processes.

In a shockproof and portable disk storage apparatus according to the present invention, a fixed disk storage unit is encased in an outer case and a connector for electrically connecting to the fixed disk storage unit inside of the outer case is provided at one end of the outer case. A flexible cable is provided between the connector and the fixed disk storage unit. One end of the fixed disk storage unit is supported by the flexible cable and the other end of the fixed disk storage unit is supported by shock absorbers with elasticity against the elasticity of the flexible cable.

According to such a construction of the present invention, the flexible cable is constructed so as to function as a shock absorber and supports the fixed disk storage unit at one end of the fixed disk storage unit. Therefore, the flexible cable serves not only as a supporting member of the fixed disk storage unit, but also as a shock absorber to absorb shock given to the fixed disk storage unit, including shock transmitted from the connector during connection. Also, according to such a construction of the present invention, since only attaching the fixed disk Storage unit to the flexible cable is needed to complete the assembling process of the outer case and the fixed disk storage unit, it is possible to make the disk storage apparatus small and its manufacturing and assembling processes simple.

Moreover, in a shockproof and portable disk storage apparatus according to the present invention, in arranging the fixed magnetic disk storage unit in the outer case, a head/disk enclosure including a rotatable magnetic disk medium and mechanical parts of a head actuator which moves over the magnetic disk medium for reading and writing therein, and an electronic card on which electronic circuits for controlling the inside of the head/disk enclosure are mounted, are placed abreast on substantially the same plane in the outer case, and the head/disk enclosure is supported by the shock absorbers.

According to such a construction of the present invention, since the head/disk enclosure and the electronic card are placed abreast on substantially the same plane in the outer case, it is possible not only to take measures to absorb shock but also to make the overall thickness of the shockproof and portable disk storage apparatus small.

DETAILED DESCRIPTION OF THE PREFERRED EMBODIMENT

Figure 1:
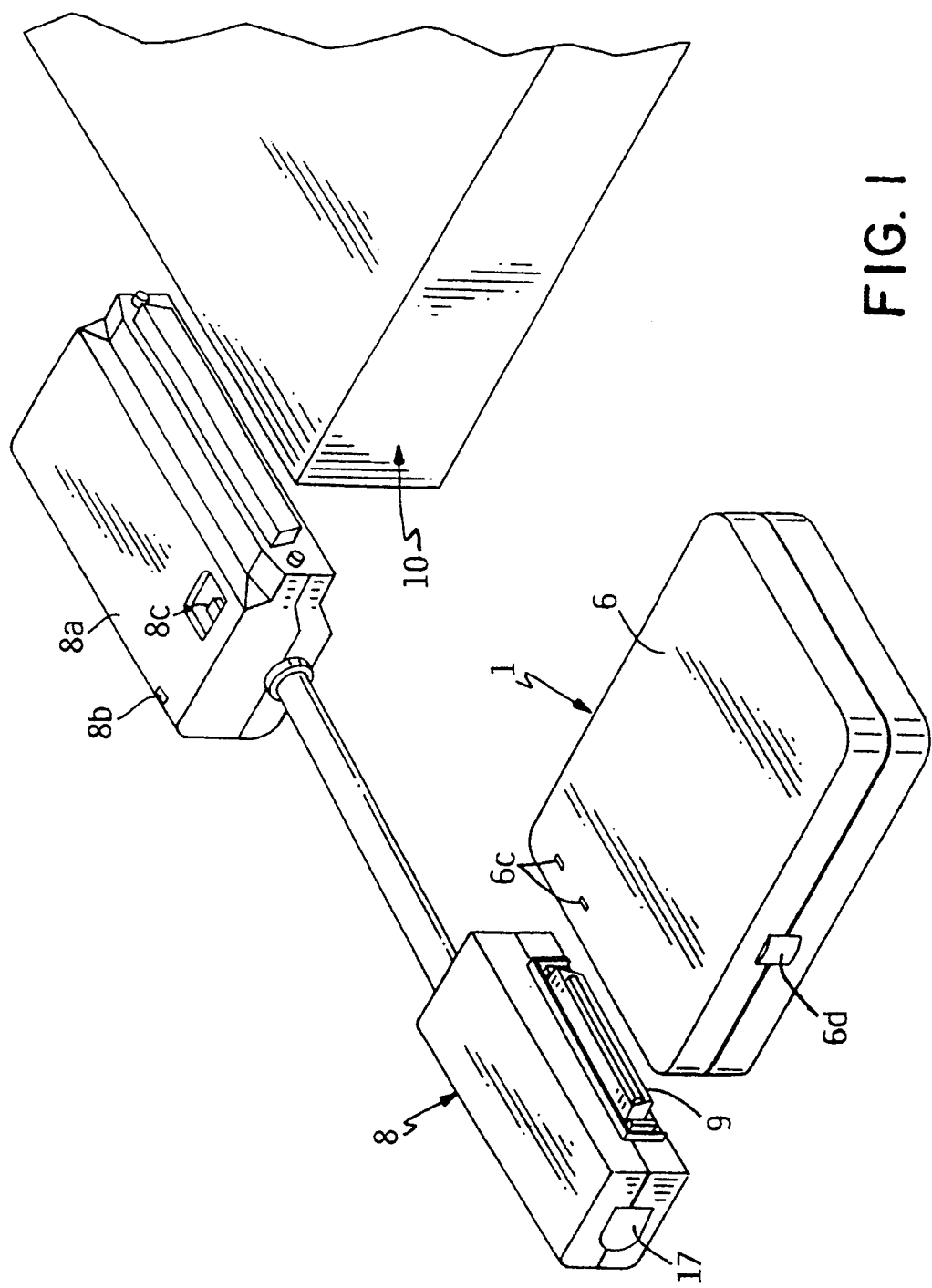
FIG. 1 is a perspective view showing a shockproof and portable disk storage apparatus, its adapter, and part of a host data processing unit of an embodiment according to the present invention.
Figure 2:
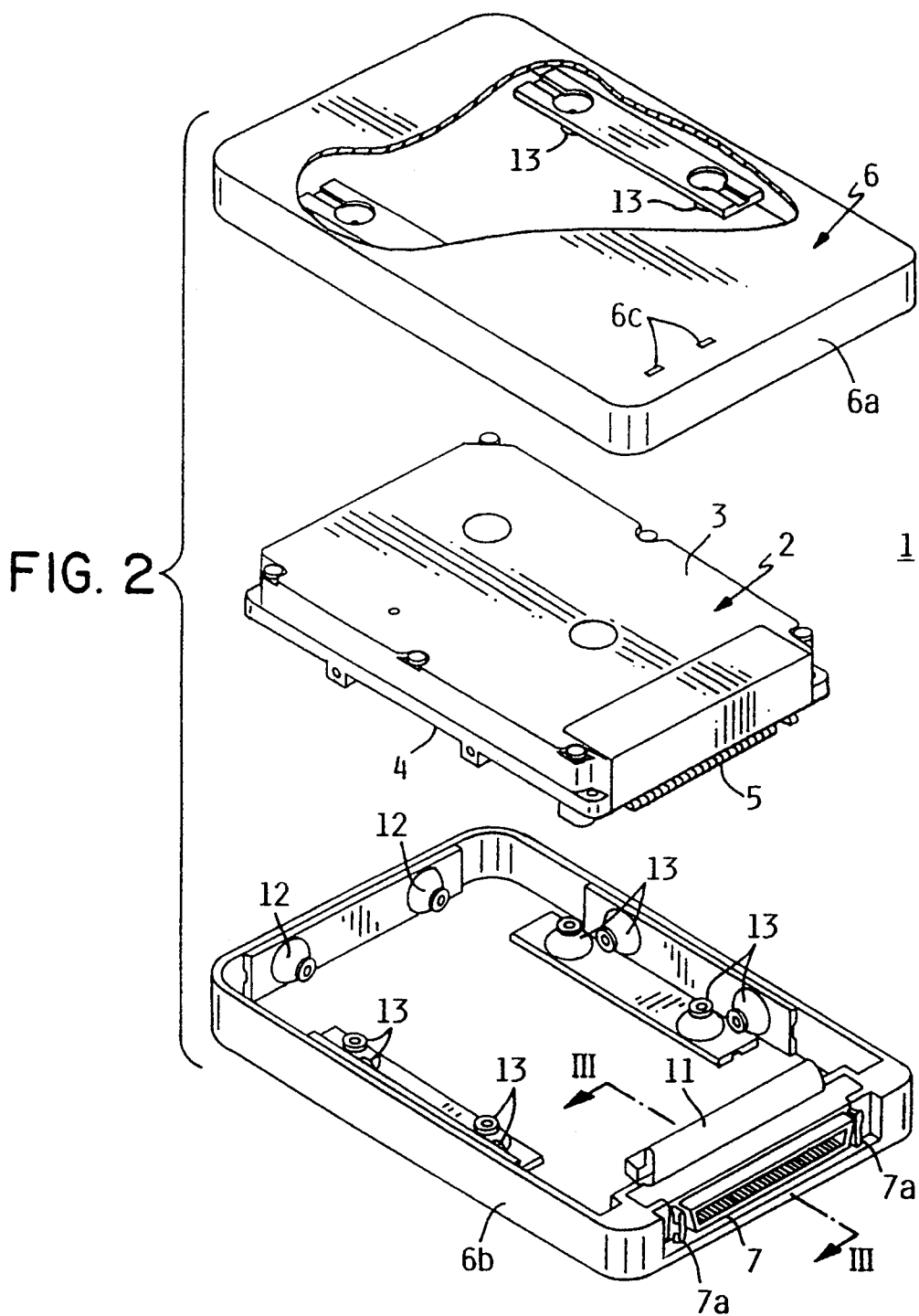
FIG. 2 is an exploded perspective view showing the shockproof and portable disk storage apparatus of the embodiment according to the present invention.

In the following, an embodiment of the present invention is described by reference to drawings. FIG. 1 is a perspective view showing exchangeable, shockproof, and portable disk storage apparatus 1 according to an embodiment of the present invention, and its adapter 8, and a part of host data processing system 10 of an embodiment according to the present invention. FIG. 2 is an exploded perspective view showing the internal construction of shockproof and portable disk storage apparatus 1 of the embodiment.

In FIG. 2, indicated by 2 is a well-known 2.5-inch type of fixed magnetic hard disk storage unit including head/disk enclosure 3 and electronic card 4. Head/disk enclosure 3 includes an unillustrated rotatable magnetic disk medium and an unillustrated head actuator which moves over the magnetic disk medium for reading and writing. Head/disk enclosure 3 provides a particular environment to protect these mechanical parts enclosed therein from outer dust or dirt.

Attached to the bottom of head/disk enclosure 3 so as to be overlaid using unillustrated screws and the like is electronic card 4 on which electronic circuits for controlling unillustrated parts inside of the enclosure and for controlling reading and writing are mounted. Provided to one end of electronic card 4 are card connector pins 5, which serve as an interface for supplying power from the outside and for sending and receiving signals. Fixed magnetic hard disk storage unit 2 is a 2.5-inch type of fixed magnetic hard disk storage unit, which is 10 cm×7 cm×1.3 cm in size and about a hundred and several tens grams in weight, and has a storage capacity of 40M to 80M bytes and an average access time of 19 ms. An example of such a 2.5-inch type of fixed magnetic hard disk storage unit is disclosed in Japanese Patent Application No. 3-260500 (Sep. 12th 1991) assigned to this applicant.

Indicated by 6 is a protective plastic outer case for encasing fixed magnetic hard disk storage unit 2, which is comprised of cover 6a and bottom section 6b. Cover 6a and bottom section 6b are connected by unillustrated screws. The plastic section forming outer case 6 itself also has elasticity and plays a part in absorbing shock toward fixed hard magnetic disk storage unit 2 inside outer case 6. Provided at one end of bottom section 6b of outer case 6 is connector 7, which is connected to connector 9 of adapter 8 shown in FIG. 1. Through adapter 8, fixed magnetic hard disk storage unit 2 in outer case 6 is connected to host data processing unit 10 such as a personal computer. Connector 7 of outer case 6 is connected not only to signal lines, but also to a power line from adapter 8, to send or receive signals to or from adapter 8 and supply power to fixed magnetic hard disk storage unit 2 in outer case 6.

Figure 3:
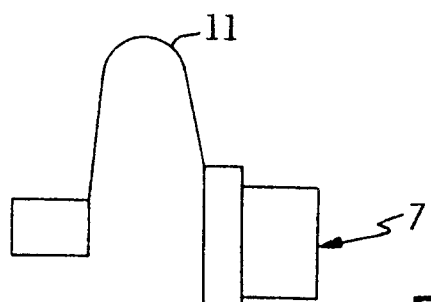
FIG. 3 is a sectional view showing a connector, taken along the plane of line III—III of FIG. 2, which is used in the embodiment of the present invention.

As shown in FIG. 2 and FIG. 3, the signal lines and the power line which extend from connector 7 into outer case 6 are assembled into belt-shaped flexible cable 11. One end of flexible cable 11 is connected to connector 7. Flexible cable 11 is selected to have predetermined elasticity for the purpose described later. The other end of flexible cable 11 is connected to card connector pins 5 of electronic card 4 of fixed magnetic hard disk storage unit 2 to supply signals and power to electronic card 4 from adapter 8. Flexible cable 11 is placed in an inverted U-shape between connector 7 of outer case 6 and card connector pins 5 of fixed magnetic hard disk storage unit 2 so as to elastically support both ends of fixed magnetic hard disk storage unit 2 separated from the inner surface of outer case 6 in conjunction with shock absorbers 12 described later. Moreover, flexible cable 11 prevents mechanical shock during connection or detachment of connector 7 to or from connector 9 the adapter 8, from being transmitted directly to fixed magnetic hard disk storage unit 2.

Figure 4:
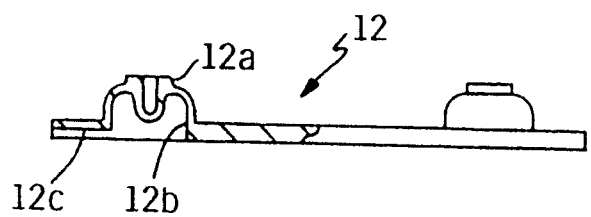
FIG. 4 is a front view partly in section, of shock absorbers used in the embodiment of the present invention.

Provided to the inside wall opposite the other end of bottom section 6b of outer case 6 to connector 7 are two roughly-cylindrical shock absorbers 12 made of elastic materials. FIG. 4 shows the details of shock absorbers 12, in which a concavity is formed in top 12a which is to contact fixed magnetic hard disk storage unit 2, a cavity is formed in bottom 12b fixed to the outer case, and air hole 12c is formed to communicate the cavity to the outside. Shock absorbers 12 are attached, in pairs, to the inside wall opposite to connector 7 of bottom section 6b of outer case 6 by adhesive tape. Shock absorbers 12 separate both ends of fixed magnetic hard disk storage unit 2 from outer case 6 in conjunction with flexible cable 11, and elastically support them to absorb shock, thereby preventing mechanical structure in head/disk enclosure 3 from damage. Since the elasticity of shock absorbers 12 in conjunction with that of flexible cable 11 separates both ends of fixed magnetic hard disk storage unit 2 from outer case 6 and elastically supports them to absorb shock, each elasticity is selected to be inversely counterbalanced through fixed magnetic hard disk storage unit 2.

That is, the elasticity of flexible cable 11, when it is placed in outer case 6 in an inverted U-shape as shown in FIG. 3, is selected so as not to be broken owing to the elasticity of shock absorber 12 and the weight of fixed magnetic hard disk storage unit 2 or not to break shock absorbers 12 in conjunction with the weight of fixed hard magnetic disk storage unit 2.

In addition to shock absorbers 12, shock absorbers 13 are provided to the bottom surface of bottom section 6b of outer case 6, the inner surface of the both sides to which connector 7 is not fixed, and the inner surface of cover 6a. Therefore, fixed magnetic hard disk storage unit 2 is elastically supported and separated from the four inner surfaces of outer case 6 in outer case 6. Shock absorbers 13 may be of the same structure as shock absorbers 12. Fixed magnetic hard disk storage unit 2 is thus supported, by the top sections of shock absorbers 12 and 13 and flexible cable 11, in a state in which it floats and is separated from the inner surfaces of outer case 6 in outer case 6.

In the assembly process of shockproof and portable disk storage apparatus 1 of the embodiment, the steps for integrally assembling outer case 6 and fixed magnetic hard disk storage unit 2 are as follows: first, card connector pins 5 of electronic card 4 of fixed magnetic hard disk storage unit 2 are connected to the other end of flexible cable 11 which extends into bottom section 6b of outer case 6; secondly, fixed magnetic hard disk storage unit 2 itself is placed on shock absorbers 12 and 13 implanted into the inside walls of bottom section 6b of outer case 6; and finally, cover 6a and bottom section 6b of outer case 6 are connected by unillustrated screws. Thus, the assembly process becomes remarkably simple. Further, since fixed magnetic hard disk storage unit 2 is positioned on shock absorbers 12 and 13 during the assembly process, it is possible to minimize vibration and shock transmitted to fixed magnetic hard disk storage unit 2 during the assembly process. Still further, since fixed magnetic hard disk storage unit 2 elastically contacts shock absorbers 12 and 13 and flexible cable 11 and is supported, without being fixed in six directions in outer case 6, it is easy to remove fixed magnetic hard disk storage unit 2 from outer case 6 and exchange it.

In shockproof and portable disk storage apparatus 1 of the embodiment, shock from the outside is first absorbed through the elasticity of outer case 6 and then absorbed by shock absorbers 12 and 13 and flexible cable 11, and thereby shockproof performance increases both during non-operation and during operation. Such shockproof construction is essential to a portable fixed magnetic hard disk storage apparatus.

Moreover, small window 6c provided in outer case 6 may be provided with a light-emitting diode (LED), which indicates the running condition of fixed magnetic hard disk storage unit 2 to a user so as to prevent connector 7 from being carelessly removed. A section of outer case 6 may be provided with protrusion 6d as a hold used to connect and detach both connectors 7 and 9 from each other.

In shockproof and portable disk storage apparatus 1 of the embodiment, since flexible cable 11 and shock absorbers 12 facing it elastically support both ends of fixed magnetic hard disk storage unit 2 and absorb shock, it is possible to make the entire outer case 6 thin. That is, the overall size of outer case 6 is about 12.4 cm × 8.6 cm × 2.5 cm, which means that it is only about 2.4 cm in length, about 1.6 cm in width, and about 1.2 cm in height larger than 2.5-inch type fixed magnetic hard disk storage unit 2. Therefore, the present invention has also the advantage of the miniaturization of shockproof and portable disk storage apparatus 1. Besides, the total weight of shockproof and portable disk storage apparatus 1 is only two hundred and several tens grams.

Figure 5:
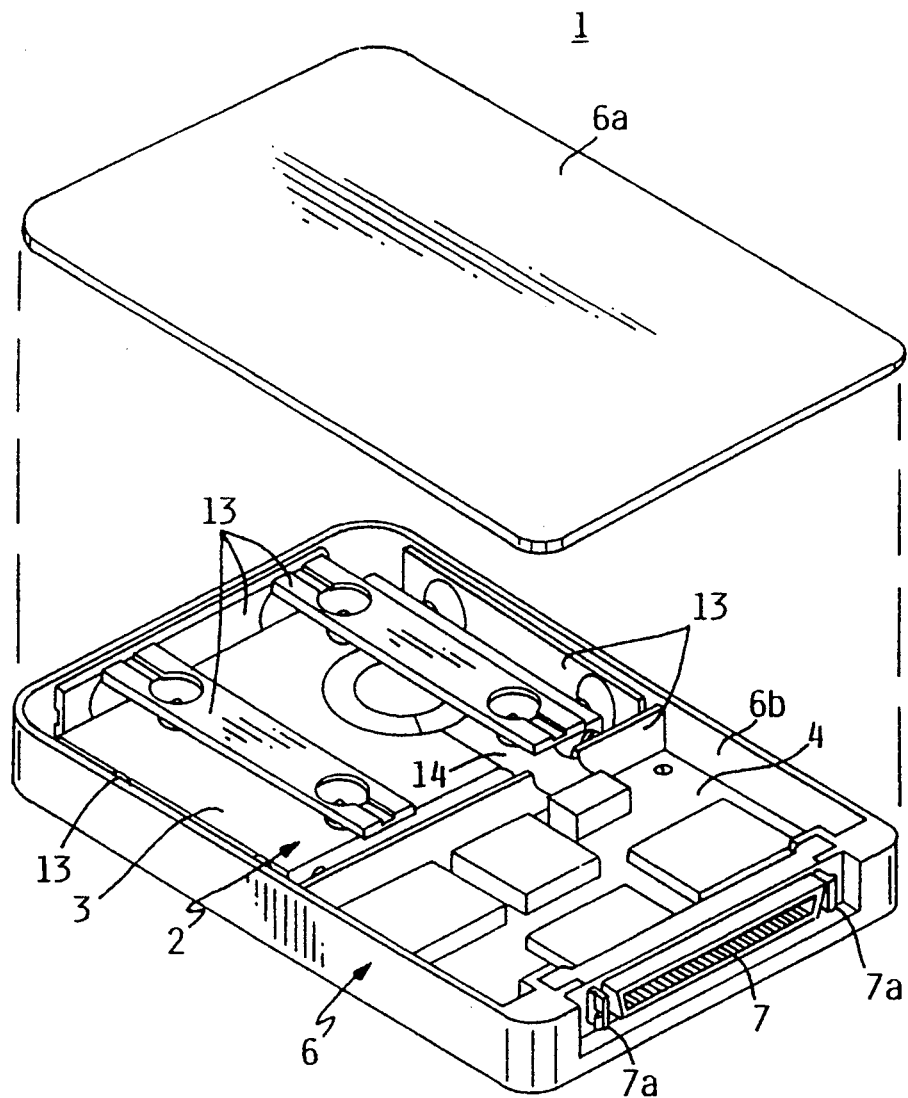
FIG. 5 is an exploded perspective view showing the shockproof and portable disk storage apparatus of the embodiment according to the present invention.
Figure 6:
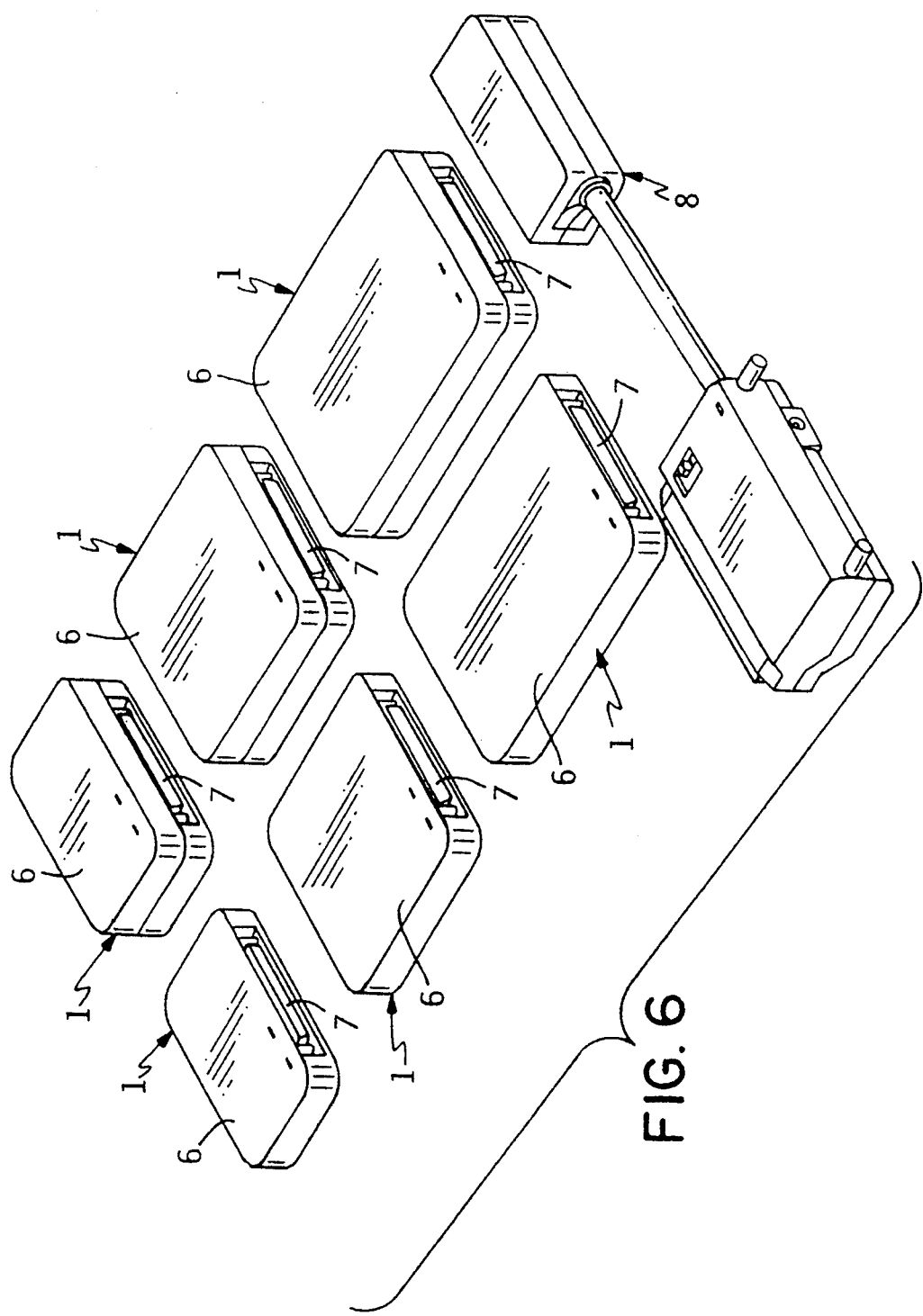
FIG. 6 is a perspective view showing the shockproof and portable disk storage apparatus and the adapter of another example of the embodiment according to the present invention.

FIG. 5 is another figure showing the present invention. In the present invention, head/disk enclosure 3 and electronic card 4 on which controlling electronic circuits are mounted, which compose fixed magnetic hard disk storage unit 2, are placed abreast on substantially the same plane in outer case 6. Fixed magnetic hard disk storage unit 2 shown in FIG. 5 may be, for example, a 1.8- or 1.3-inch type fixed magnetic hard disk storage unit, and head/disk enclosure 3 encasing a magnetic disk medium and a head actuator may be a smaller one than in a 2.5-inch type. Therefore, even if electronic card 4 is placed abreast, it is possible to make the size of outer case 6 of shockproof and portable disk storage apparatus 1 substantially the same in length and width as the 2.5-inch type. On the other hand, the size of connector 7 attached to one end of outer case 6 should remain unchanged to maintain connectability with adapter 8 even if the size of the fixed magnetic hard disk storage unit inside the outer case is changed. Therefore, even if the size of outer case 6 is changed as shown in FIG. 6, connector 7 of outer case 6 should be the same size.

As shown in FIG. 5, if electronic card 4 and head/disk enclosure 3 are placed abreast in outer case 6, it is possible to make the thickness of outer case 6 small. Electronic card 4 is connected directly with connector 7 and attached direct to outer case 6. Even in this way, electronic card 4 is strong enough for shock because only electronic parts are mounted on it. On the other hand, head/disk enclosure 3 is attached in outer case 6 in such a way as to be separated from outer case 6 through shock absorbers 13. Head/disk enclosure 3 and electronic card 4 are connected through flexible cable 14 so that shock may not be transmitted from electronic card 4 to head/disk enclosure 3 during connection. Therefore, head/disk enclosure 3 is supported by shock absorbers 13 and flexible cable 14 in a state such that it floats and is separated from outer case 6. If head/disk enclosure 3 is detached from electronic card 4 in this way, the property of absorbing shock is remarkably improved because shock absorbers 13 have only to support the weight of head/disk enclosure 3.

Referring to FIG. 1, indicated by 8 is an adapter to which above-mentioned shockproof and portable disk storage apparatus 1 according to the present invention is connected through connector 9. The other end 8a of adapter 8 is connected to host data processing unit 10 such as a personal computer. Adapter 8 can perform the following functions in addition to serving as a relay device for supplying power to and sending or receiving signals to or from above-mentioned shockproof and portable disk storage apparatus 1.

Figure 7:
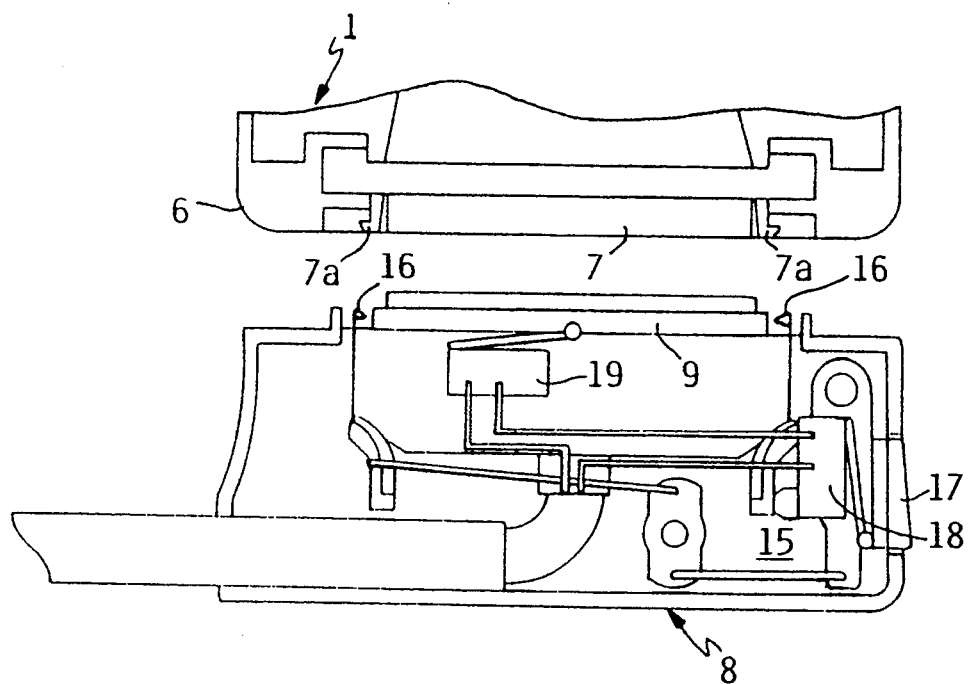
FIG. 7 is a sectional view showing a state in which the shockproof and portable disk storage apparatus and a connector of its adapter of the embodiment according to the present invention are disconnected.
Figure 8:
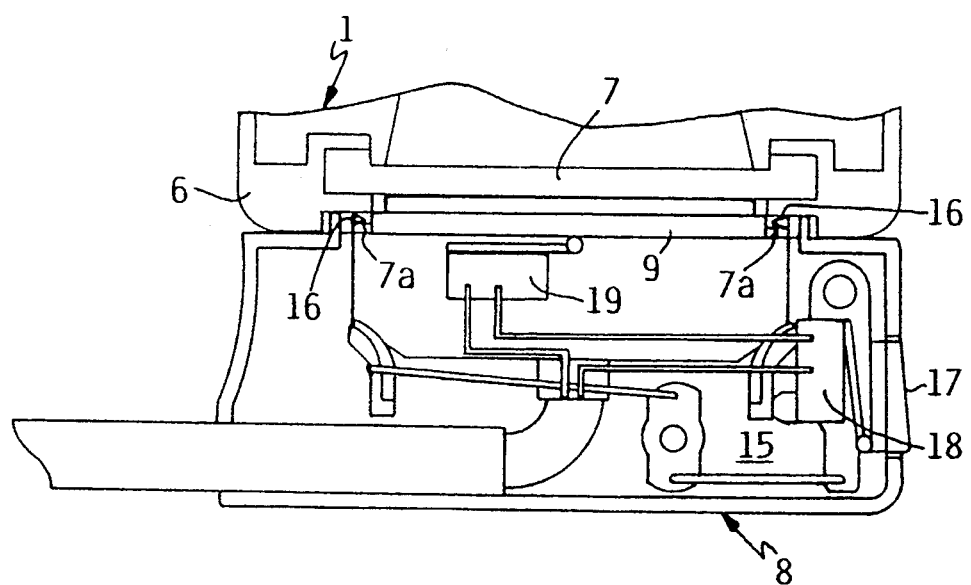
FIG. 8 is a sectional view showing a state in which the shockproof and portable disk storage apparatus and the connector of its adapter of the embodiment according to the present invention are connected.

Referring to FIG. 7 and FIG. 8, formed in both ends of connector 7 of outer case 6 of shockproof and portable disk storage apparatus 1 are sections 7a which engage with latches 16 of latch mechanism 15 of adapter 8. When adapter 8 and shockproof and portable disk storage apparatus 1 are connected, latches 16 of adapter 8 are engaged with sections 7a at both ends of connector 7. To detach them, release button 17 of adapter 8 must be pushed to open latches 16 and release the engagement with sections 7a at both ends of connector 7. This prevents connector 7 from being carelessly detached from connector 9 of adapter 8 during operation of shockproof and portable disk storage apparatus 1 and prevents destruction of data stored on a disk medium of fixed magnetic hard disk storage unit 2. Further, provided to release button 17 of adapter 8 is switch 18 through which a power line from adapter 8 to connector 7 is disconnected by pushing release button 17 of adapter 8. Therefore, when release button 17 is pushed, fixed magnetic hard disk storage unit 2 in outer case 6 which is connected to connector 7 detects that power is off and immediately begins a power-off sequence.

Figure 9:
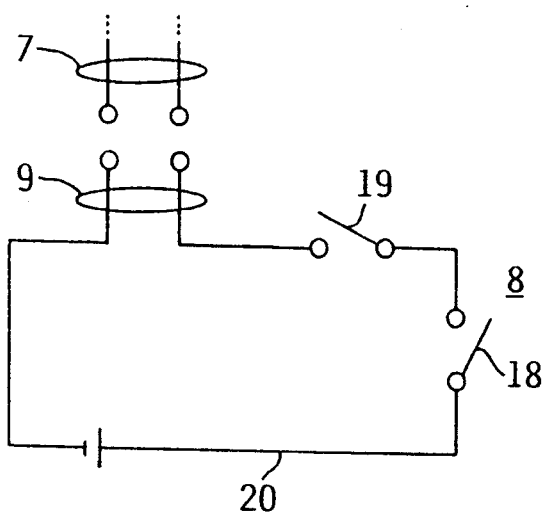
FIG. 9 is a circuit diagram showing a switching circuit for a power line in the adapter of the embodiment according to the present invention.

Therefore, as soon as release button 17 is carelessly pushed during operation of fixed magnetic hard disk storage unit 2, it is turned off and begins a power-off sequence so as to preserve a record of its state, so that it is possible to maintain the integrity of data stored on the disk medium. Further, power switch 19 may be provided to connector 9 on the side of adapter 8 which engages with connector 7 to put a power line from adapter 8 to fixed magnetic hard disk storage unit 2 in a disconnect state unless both connectors 7 and 9 engage with each other. As shown in FIG. 9, in adapter 8, power switch 19 of connector 9 and power switch 18 for release button 17 may be connected in series so that power line 20 cannot be connected to fixed magnetic hard disk storage unit 2 until both switches are closed, and so that power may be supplied from power line 20 only when both connectors 7 and 9 engage with each other and release button 17 has not been pushed. Thereby the integrity of data in disk storage apparatus 1 may be preserved.

Referring now to FIG. 1, adapter 8 may include a memory in which a basic input/output system (BIOS) is stored for disk storage apparatus 1, so as to be able to make use of disk storage apparatus 1 immediately if only adapter 8 is connected directly to host personal computer 10. This allows personal computer 10 to make use of disk storage apparatus 1 connected to adapter 8 without using the basic input/output system of persona computer 10, and therefore has the advantage that a user can make use of disk storage apparatus 1 at once without rewriting every CONFIG.SYS of the operating system of host personal computer 10.

Further, adapter 8 may include a memory in which a diagnostic program is stored, and include light-emitting diode (LED) 8b, a buzzer or the like so as to inform a user of a state of the disk storage apparatus 1 connected to adapter 8. Such a measure is taken for the reason that adapter 8 itself needs to, for example, diagnose a failure in disk storage apparatus 1 unless the basic input/output system of host 10 is used.

Still further, adapter 8 may have a function for automatically detecting the specification of an interface to disk storage apparatus 1 connected to adapter 8 and that of an interface to the host, that is, personal computer 10, to which adapter 8 is connected and a function for converting different interface designs, so that disk storage apparatus 1 with an interface design may be connected to the host, that is, personal computer 10, with a different interface design. For example, if disk storage apparatus 1 has a SCSI interface and host personal computer 10 has an AT interface, adapter 8 may have a function for converting different interface designs so that disk storage apparatus 1 with the SCSI interface may be connected to personal computer 10 with the AT interface.

Further, adapter 8 may include a power function which allows disk storage apparatus 1 to be connected thereto without affecting power supplied to a host, that is, a personal computer. In this case, unillustrated power terminals and power switch 8c are provided to adapter 8.

According to the construction of the present invention, a flexible cable supports one end of a fixed disk storage unit. Therefore, the flexible cable serves not only as a supporting member for the fixed disk storage unit, but also as a shock absorber to absorb shock, including shock transmitted from a connector during connection. Therefore, it is possible to make a shockproof and portable disk storage apparatus small and its manufacturing and assembling processes simple.

Further, in the shockproof and portable disk storage apparatus according to the present invention, a head/-disk enclosure including mechanical parts therein, and an electronic card on which electronic circuits for controlling the inside of the head/disk enclosure are mounted, are placed abreast on substantially the same plane in an outer case, and the head/disk enclosure is supported by the shock absorbers in the outer case. Therefore, it is possible not only to take measures to absorb shock for the shockproof and portable disk storage apparatus, but also to make its overall thickness small.

What is claimed is:

1. A shockproof and portable disk storage apparatus, comprising:
    a fixed disk storage unit;
    an outer case housing the fixed disk storage unit therein;
    a connector provided at a first end of said outer case;
    a flexible cable provided in said outer case for electrically connecting said connector with said fixed disk storage unit, said flexible cable urging said fixed disk storage unit toward a second end of the outer case, opposite said first end, in said outer case; and
    a first shock absorber provided in said outer case at the second end of said case, for urging said fixed disk storage unit to the first end of said outer case against said flexible cable.

2. The shockproof and portable disk storage apparatus according to claim 1, wherein said first shock absorber includes discrete elastic members provided on the inside wall at the second end of said outer case.

3. The shockproof and portable disk storage apparatus according to claim 2, wherein said elastic members are cylindrical, and one end thereof is fixed to the inside wall at the second end of said outer case and the other end thereof contacts said fixed disk storage unit.

4. The shockproof and portable disk storage apparatus according to claim 1, wherein second shock absorbers are provided on inner surfaces of one or more sides of said outer case, said sides being substantially orthogonal to said first and second ends, so as to support said fixed disk storage unit with being isolated from the inner surfaces of said outer case.

5. The shockproof and portable disk storage apparatus according to claim 4, wherein said second shock absorbers are discrete elastic members provided on the inner surfaces of said outer case.

6. The shockproof and portable disk storage apparatus according to claim 5, wherein said elastic members are cylindrical, and one end thereof is fixed to the inner surface of said outer case and the other end thereof contacts said fixed disk storage unit.

7. The shockproof and portable disk storage apparatus according to claim 1, wherein said fixed disk storage unit has a head/disk enclosure including a rotatable disk medium and a movable head actuator which is able to move over said disk medium for reading/writing therein and an electronic card which is fixed to the head/disk enclosure and on which electronic circuits for controlling the inside of said head/disk enclosure are mounted, and one end of said flexible cable is connected to said connector and the other end of said flexible cable is connected to card connector pins provided on said electronic card.

8. The shockproof and portable disk storage apparatus according to claim 1, wherein said outer case is made of materials which absorb shock.

* * * * *